April 29, 1924.

E. G. SHAFFER

FRYING BASKET

Filed Aug. 2, 1923

1,491,974

INVENTOR
Emma G. Shaffer
BY
Adam E. Fisher
ATTORNEY

Patented Apr. 29, 1924.

1,491,974

UNITED STATES PATENT OFFICE.

EMMA G. SHAFFER, OF WENONAH, NEW JERSEY.

FRYING BASKET.

Application filed August 2, 1923. Serial No. 655,304.

*To all whom it may concern:*

Be it known that I, EMMA G. SHAFFER, a citizen of the United States, residing in the city of Wenonah, county of Gloucester, and State of New Jersey, have invented new and useful Improvements in Frying Baskets, of which the following is a specification, reference being had to the accompanying drawings.

This invention is in the way of a culinary utensil, and may be called a "frying basket" inasmuch as the main object of the invention is to provide a simple, practical device for use in frying or otherwise cooking foods for the table. Another object is to provide such a device as will enable the user to fry or cook a batch of relatively small food quickly, and to remove the same from the stove all in one movement, without the need of repeated movements to perform this operation.

In the drawing—

Figure 1:
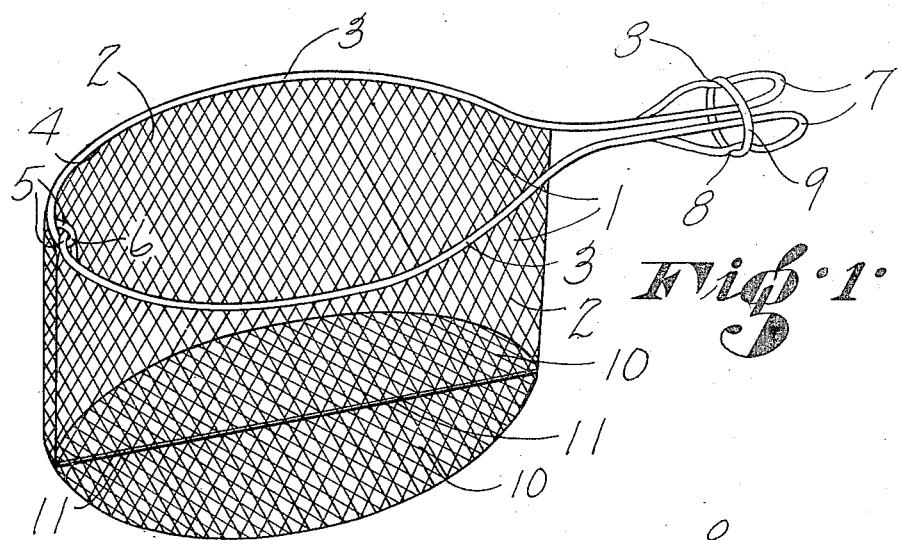
Figure 1 is a perspective view of the device in closed position.
Figure 2:
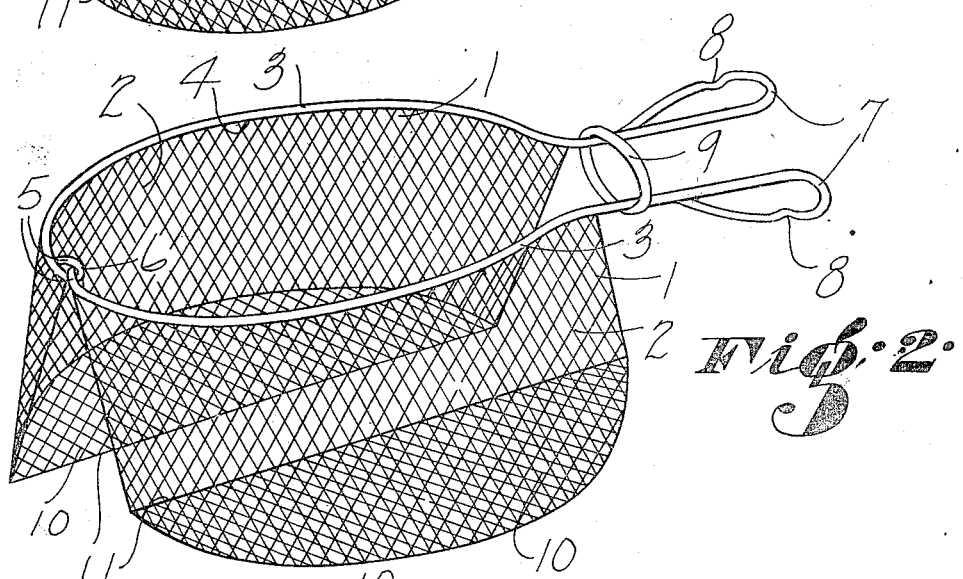
Figure 2 is a perspective view of the device in open position.
Figure 3:
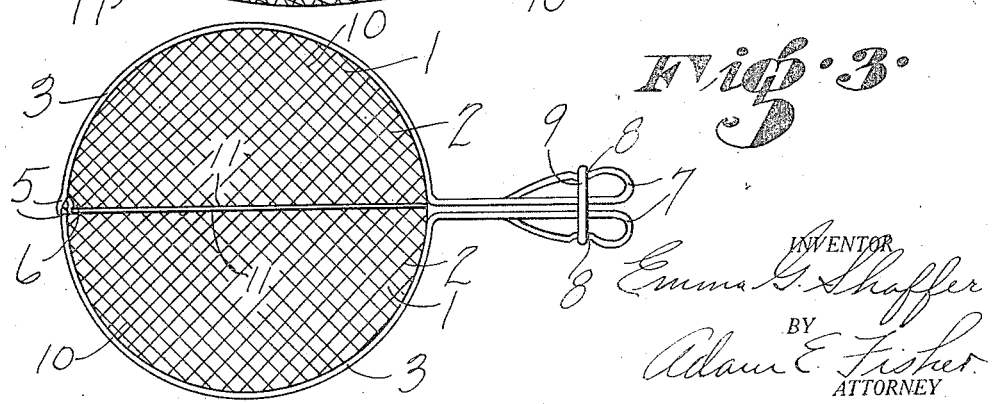
Figure 3 is a top view of the device in closed position.

The device consists of two half-baskets 1 made of wire mesh 2 or other suitable material calculated to resist the action of heat; each half-basket including a semi-circular arm 3 at the top thereof, to which the wire mesh 2 is joined all around, as shown at 4. The arms 3 are formed with loops 5, looped one through the other so as to form a loose joint 6 at this point. The opposite ends of the arms 3 are formed into looped handles 7, having notches 8 formed therein adapted to receive and hold a ring 9, which is slid over the handles. The bottom portions 10 of the half-baskets are formed flatly, and straight across at their meeting edges 11, so that when these edges are brought together the result is a complete basket with a continuous bottom. When the ring 9 is slid outwardly on the handles 7, and pressed into the notches 8, the two half-baskets 1 are forced together into and form substantially a single unitary basket, into which food of any kind may be placed, and so deposited in the frying pan or other cooking vessel for the purpose of frying or cooking said food. After this operation is completed, the basket is withdrawn and held over the dish into which it is desired to deposit the cooked food; the ring 9 is slid down upon the handles 7 and out of the notches 8, thus allowing the handles 7 to spread apart. These handles may now be turned on the loose joint 6, so as to throw the two half-baskets 1 apart at the bottom edges 11, so as to allow the food to fall through into the dish below.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described comprising two half-baskets of wire mesh, adapted when brought together to form a complete unitary basket; two semi-circular arms, one attached to and supporting each of the half-baskets, the arms being loosely looped together at one side of the basket, and being formed into looped handles at the opposite side of the basket, the said handles being provided with notches formed therein; and a ring adapted to fit onto the handles and engage the notches thereof for holding the half-baskets.

EMMA G. SHAFFER.

Witnesses:
WILLIAM S. ALLEN,
JESSE W. ENGLISH.